United States Patent
Faller et al.

(10) Patent No.: US 6,577,026 B1
(45) Date of Patent: Jun. 10, 2003

(54) CIRCUIT ARRANGEMENT FOR SUPPLYING ELECTRIC POWER TO A NETWORK COMPRISING A FUEL CELL AND AN ACCUMULATOR SYSTEM

(75) Inventors: Peter Faller, Ulm (DE); Axel Jansen, Ulm (DE); Andreas Schell, Stuttgart (DE); Josef Sonntag, Senden (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/623,911
(22) PCT Filed: Feb. 23, 1999
(86) PCT No.: PCT/EP99/01146
§ 371 (c)(1),
(2), (4) Date: Nov. 17, 2000
(87) PCT Pub. No.: WO99/46845
PCT Pub. Date: Sep. 16, 1999

(30) Foreign Application Priority Data

Mar. 11, 1998 (DE) .......................................... 198 10 468

(51) Int. Cl.⁷ .............................................. B60L 11/18
(52) U.S. Cl. ............................. 307/86; 307/40; 307/45; 307/46; 307/10.1
(58) Field of Search ............................. 307/86, 43, 45, 307/46, 66, 10.1; 429/13; 320/132; 323/224

(56) References Cited

U.S. PATENT DOCUMENTS

| | | | | |
|---|---|---|---|---|
| 4,775,800 A | | 10/1988 | Wood ........................... 307/46 |
| 4,839,574 A | * | 6/1989 | Takabayashi .................. 320/2 |
| 4,883,724 A | * | 11/1989 | Yamamoto .................... 429/23 |
| 5,334,463 A | | 8/1994 | Tajima et al. | |
| 5,714,874 A | * | 2/1998 | Bonnefoy ..................... 323/299 |
| 5,903,449 A | * | 5/1999 | Garrigan et al. ............... 363/41 |
| 5,929,537 A | * | 7/1999 | Glennon ....................... 307/46 |
| 5,998,885 A | * | 12/1999 | Tamor et al. ................. 307/10.1 |

FOREIGN PATENT DOCUMENTS

| | | |
|---|---|---|
| DE | 44 31 747 A1 | 3/1995 |
| DE | 197 37 406 | 3/1998 |
| JP | 09 171831 | 6/1997 |

OTHER PUBLICATIONS

K.V. Kordesch, "Hydrogen–Air/Lead Battery Hybrid System for Vehicle Propoulsion" Journal of the Electrochemical Society, vol. 118, No. 5, pp. 812–817, May 1971.

German Office Action dated May 21, 2001.

* cited by examiner

Primary Examiner—Brian Sircus
Assistant Examiner—Robert L DeBeradinis
(74) Attorney, Agent, or Firm—Crowell & Moring LLP

(57) ABSTRACT

A circuit arrangement for supplying electrical energy to a power supply has a fuel cell and an accumulator arrangement. Electrical energy is delivered by the accumulator arrangement during the starting procedure, and is fed into the power supply by the accumulator arrangement via at least one DC/DC converter during starting of the circuit arrangement.

10 Claims, 2 Drawing Sheets

CIRCUIT ARRANGEMENT FOR SUPPLYING ELECTRIC POWER TO A NETWORK COMPRISING A FUEL CELL AND AN ACCUMULATOR SYSTEM

BACKGROUND AND SUMMARY OF THE INVENTION

This application claims the priority of PCT International Application No. PCT/EP99/01146, filed Feb. 23, 1999 and German patent document No. 198 10 468.5, filed Mar. 11, 1998, the disclosures of which is expressly incorporated by reference herein.

The present invention relates to a circuit arrangement for supplying electrical energy to a power supply which has a fuel cell and an accumulator device which delivers electrical energy during the starting procedure.

Such a circuit arrangement is disclosed in Journal of the Electrochemical Society, vol. 118, No. 5, May 1971, pages 812–817; K. V. Kordesch: Hydrogen-Air/Lead Battery Hybrid System for Vehicle Propulsion. According to this publication, a fuel cell and an accumulator arrangement are connected to one another by a diode whose polarity prevents a flow of current from the accumulator arrangement to the fuel cell, to prevent outgassing while the fuel cell is idle. To simplify the starting procedure, the voltage of the accumulator arrangement can be applied to the fuel cell for starting purposes, by shorting the diode via a resistor and a switch connected in series therewith. A comparatively small current then flows and changes the individual cells in the fuel cell to the correct direction of polarity.

In another known circuit arrangement, disclosed in German patent document DE 197 37 406 A1, the fuel cell and the accumulator arrangement have a permanent, direct-electrical connection between them, irrespective of the operating state of the fuel cell. It is thus possible for outgassing to occur in this arrangement while the fuel cell is idle. In this case, energy is supplied to a motor and to any other loads as a result of these loads being connected to the fuel cell and to the accumulator arrangement by means of a DC/DC converter.

Another circuit arrangement is disclosed in German patent document DE 44 31 747 A1, in which a fuel cell is connected to other units of a power supply via a DC/DC converter. One of the other units is a battery. A diode is provided, whose direction of polarity prevents a flow of current from the battery to the fuel cell via the DC/DC converter.

Relatively recently, fuel cells have been used as mobile energy generation systems, requiring one or more auxiliary units for their operation. If these auxiliary units are operated electrically, they are supplied with electrical energy by the fuel cell during operation. Usually, a mobile energy generation system having fuel cells, such as a vehicle powered by fuel cells, is not operated continuously; rather, operating pauses occur, and the energy generation system needs to be restarted after such operating pause. Since the energy for driving the auxiliary units is not yet being provided by the fuel cell at the instant of starting, each auxiliary unit requires one or more additional starter units which, if driven electrically, are supplied with electrical energy from a battery.

The object of the present invention is to simplify the starting procedure for a fuel cell.

This and other objects and advantages are achieved by the circuit arrangement according to the present invention, in which electrical energy is fed into the power supply by the accumulator arrangement via at least one DC/DC converter during the starting procedure. In this manner, energy can advantageously be supplied to the auxiliary units during starting via the accumulator arrangement, thereby eliminating the need for additional starter units. Thus, the design is simplified and the weight and volume requirement for the fuel cell system is reduced (which is of particular advantage in the mobile application area). The auxiliary units are put into operation by means of the accumulator arrangement at the beginning of the starting procedure. The DC/DC converter(s) can be used to replace one or more starter units.

In one embodiment of the invention, during operation of the fuel cell (rated operation), the DC/DC converter is connected such that the accumulator arrangement is supplied with electrical energy from the power supply.

Hence, a two-way DC/DC converter is advantageously involved in this case. Advantageously, the on-board charger, which is required anyway for charging the accumulator arrangement, can be used for the purpose of charging the accumulator arrangement. Equivalent components such as transformers, power MOSFETs, capacitors etc. can advantageously be used both for charging the accumulator arrangement and for the starting procedure. During rated operation of the fuel cell, the accumulator arrangement is thus recharged by means of the at least one DC/DC converter.

In another embodiment of the invention, the DC/DC converter automatically distinguishes between rated operation and the starting mode, and changes over accordingly. This simplifies operation of the fuel cell by automatically setting the DC/DC converter to the correct state.

In still another embodiment, the DC/DC converter can be changed over between the starting mode and rated operation by means of an external signal, which may be output by a control unit, for example. When a starting procedure is carried out, the DC/DC converter can be accordingly switched such that electrical energy is fed into the power supply by the accumulator arrangement via the DC/DC converter. In rated operation of the fuel cell, the DC/DC converter can be accordingly controlled such that electrical energy is transferred to the accumulator arrangement from the power supply, which charges the accumulator arrangement.

According to another feature of the invention, the DC/DC converter delivers a signal when it is ready for the starting mode or rated operation, so that the starting procedure can advantageously begin at the correct instant.

Finally, in still another embodiment of the invention, the DC/DC converter charges the intermediate circuit capacitors of the auxiliary units during startup, which thus dispenses with the need for a separate recharging circuit.

Other objects, advantages and novel features of the present invention will become apparent from the following detailed description of the invention when considered in conjunction with the accompanying drawings.

DETAILED DESCRIPTION OF THE DRAWINGS

Figure 1:
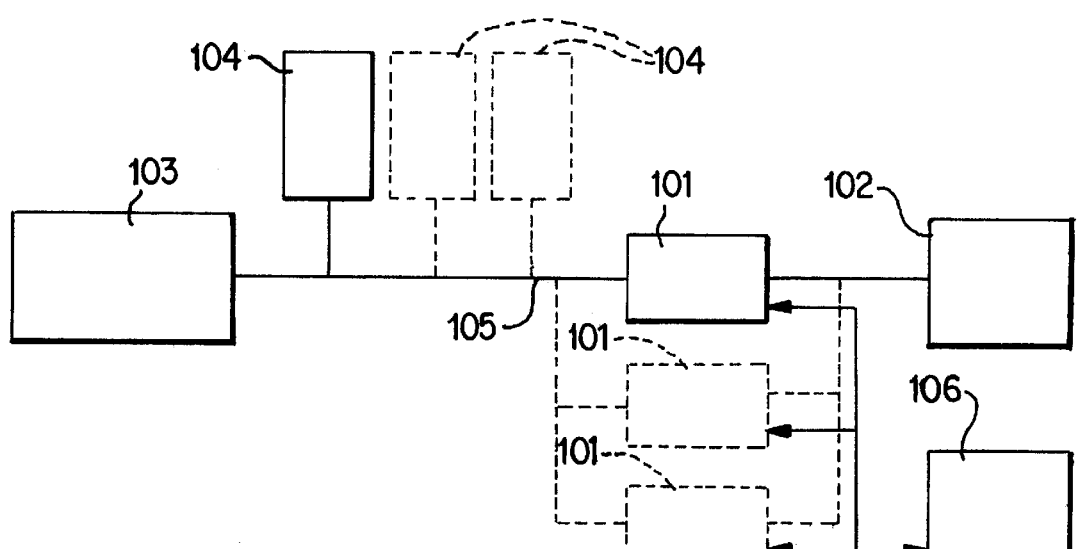
FIG. 1 is a block diagram which shows the components used according to the invention.

As FIG. 1 shows, an accumulator arrangement 102 is connected to the fuel cell DC power supply 105 via one or more DC/DC converters 101. This means that the electrical energy required for driving the auxiliary units 104 is already available at the beginning of a starting procedure, so that additional starter units can be dispensed with. Following the starting procedure (that is, during so-called rated operation), the accumulator arrangement 102 is supplied with electrical energy (that is, charged), by the fuel cell 103 via the DC/DC converter 101. The DC/DC converter 101 advantageously has a two-way design, for operation in both conversion directions. That is, energy can be transferred from the power supply 105 to the accumulator arrangement 102, so that the accumulator arrangement 102 is charged in rated operation of the fuel cell 103; or energy can be transferred from the accumulator arrangement 102 to the power supply 105, which assures the supply of energy during a starting procedure.

An embodiment is possible in which the DC/DC converter 101 is able to distinguish between the starting procedure and rated operation, based on the prevailing voltage conditions, for example. The DC/DC converter 101 can then change over according to the requirement at the present time. Advantageously, the DC/DC converter 101 delivers a signal when the changeover operation has ended and the DC/DC converter 101 is ready for the starting procedure or rated operation.

If the DC/DC converter 101 does not itself detect that the changeover operation is required, it is changed over by a control unit 106, which outputs a signal for this purpose. The ready signal from the DC/DC converter 101 is supplied to the control unit 106 when the changeover operation is complete. FIG. 1 also shows auxiliary units 104, which may be, for example, a compressor for conveying the fuel and/or the oxidant.

Figure 2:
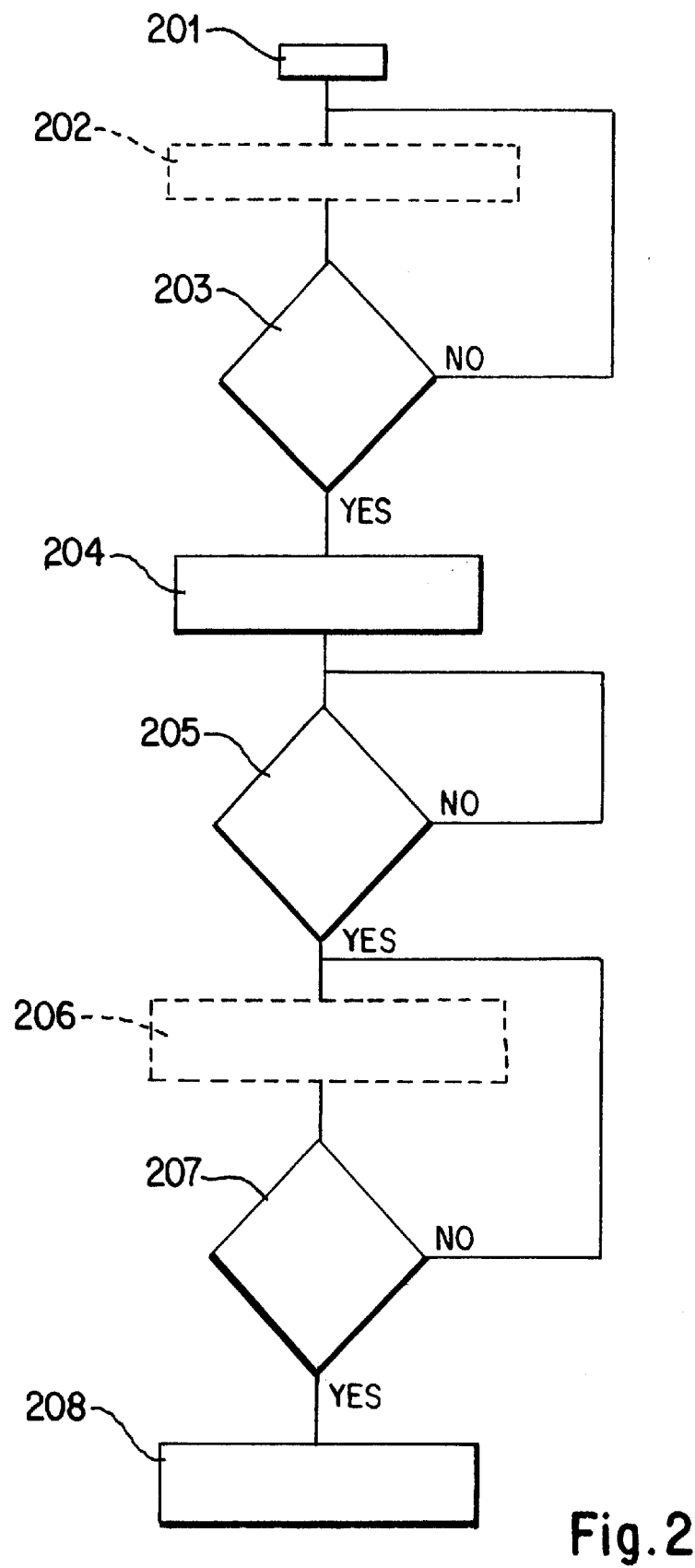
FIG. 2 is a flowchart showing the switch position and appropriate changeover of a two-way DC/DC converter.

FIG. 2 is a flowchart which shows the switch position and appropriate changeover of a two-way DC/DC converter 101. At the beginning of a starting procedure (step 201), the DC/DC converter is switched to the starting mode, either by an external signal from a control unit or else by the DC/DC converter 101 recognizing the starting procedure in step 202, as previously described.

In step 203, a check is carried out to verify that the DC/DC converter 101 is in the starting mode. If so, the process passes to step 204, where the output voltage of the DC/DC converter 101 rises, charging the latter's internal capacitors and the intermediate circuit capacitors of the auxiliary units. Consequently, precharging circuits for the auxiliary units can advantageously be dispensed with. When the DC/DC converter has reached a particular output voltage, the DC/DC converter delivers a ready signal for the starting mode. This ready signal may be supplied to a control unit, for example.

A starting procedure is then carried out, in which the auxiliary units are started by the control unit 106. In addition, the fuel cell is put into operation.

In step 205, a check is carried out to determine whether the fuel cell voltage $U_{BZ}$ exceeds the DC/DC converter output voltage $U_{DC}$. If so, the DC/DC converter advantageously changes over from the starting mode to the charging mode, step 206. The voltage conditions can be recognized directly by the DC/DC converter. It is also possible for the control unit to output a signal to the DC/DC converter in order to prompt it to change over.

In step 207, it is verified that the DC/DC converter is in the charging mode; i.e., whether it has output the appropriate ready signal.

In step 208, the fuel cell is then in rated operation.

Advantageously, the DC/DC converter additionally delivers a temperature signal which may be a digital overtemperature signal or an analogue temperature signal.

Figure 3:
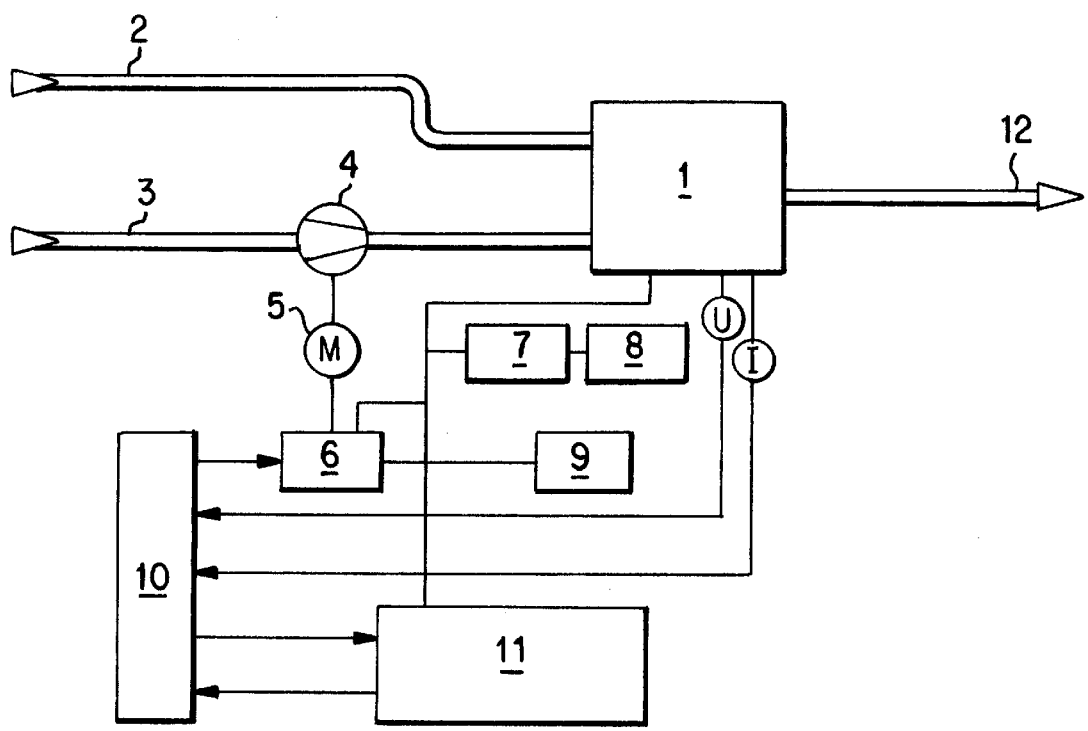
FIG. 3 shows an energy generation system for a fuel cell vehicle.

FIG. 3 shows a schematic illustration of an energy generation system for a fuel cell powered vehicle. A fuel cell 1 is supplied with fuel, for example hydrogen or methanol, by means of a first supply line 2. In addition, a second supply line 3, containing a compressor 4, is used to supply the fuel cell 1 with an oxidant, for example ambient air. In the fuel cell 1, the fuel is oxidized at the anode and the oxidant is reduced at the cathode. During this electrochemical reaction, a voltage is produced between two electrodes. By connecting a multiplicity of such cells in parallel or in series to form a so-called stack, it is possible to achieve voltages and current levels which are sufficient for driving a vehicle.

Gasses are removed from the fuel cell 1 via a discharge line 12. To drive the vehicle, a drive unit 11 is provided. The control unit 10 receives, via electrical lines, information about the oxidant mass flow dm/dt, the operating state of the drive unit 11 and the voltage U produced by the fuel cell 1, and the corresponding current I.

To drive the compressor 4, an electric motor 5 is provided which is supplied with electrical energy via a converter 6. The latter is controlled by the control unit 10, which sets the speed n of the electric motor 5, and hence of the compressor 4. The speed n of the compressor 4 can be used to influence the oxidant mass flow dm/dt, and hence the power $P_{BZ}$ of the fuel cell 1. The other (besides the compressor 4) auxiliary units 9, required for operating the fuel cell 1, are likewise supplied with electrical energy via the converter 6 or via dedicated converters.

Electrical energy is provided by this very fuel cell 1 during the fuel cell system's idling mode and driving mode, that is to say the fuel cell system supplies itself with the necessary auxiliary energy.

At the beginning of the starting procedure, this necessary auxiliary energy has not yet been provided by the fuel cell system, however. For this reason, the starter battery 8 is used, which supplies the necessary auxiliary energy to the electric motor 5 and to the further auxiliary units 9 via the DC/DC converter 7 and the converter 6 during the starting procedure. The DC/DC converter 7 is necessary in order to bring the voltage level of the starter battery 8 into line with the voltage level of the fuel cell 1.

In the fuel cell system's rated operation, following the starting procedure, the starter battery 8 is supplied with electrical energy, that is to say is charged, from the fuel cell 1 via the DC/DC converter 7. To this end, the voltage of the fuel cell 1 is again brought into line with the voltage level of the starter battery 8 in the DC/DC converter 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Circuit arrangement for supplying electrical energy to a power supply which has a fuel cell and an electrical accumulator, where electrical energy is delivered by the accumulator during starting of the fuel cell, and the accumulator can be isolated from the fuel cell at least when no starting procedure is carried out and the fuel cell is not in a rated operating mode, wherein during a starting procedure, electrical energy is fed into power consuming auxiliary units of the power supply by the accumulator, which auxiliary units help start operation of the fuel cell, via at least one DC/DC converter.

2. Circuit arrangement according to claim 1, wherein during rated operation of the fuel cell, the DC/DC converter is connected such that the accumulator arrangement is supplied with electrical energy from the power supply.

3. Circuit arrangement according to claim 1, wherein the DC/DC converter automatically distinguishes between rated operation and starting mode and changes over accordingly.

4. Circuit arrangement according to claim 1, wherein the DC/DC converter is changed over between starting mode and rated operation by means of an external signal.

5. Circuit arrangement according to claim 3, wherein the DC/DC converter delivers a signal when it is ready for the starting mode or rated operation.

6. Circuit arrangement according to claim 1, wherein the DC/DC converter charges intermediate circuit capacitors of auxiliary units during startup.

7. An electrical power supply system, comprising:
   a fuel cell;
   an electric energy accumulator;
   a DC/DC converter connected between said accumulator and said fuel cell, including power consuming auxiliary components for operating said fuel cell, said DC/DC converter being operable in a start up mode for supplying power from said accumulator to said auxiliary components which auxiliary components help start operation of the fuel cell, and in a charging mode for charging said accumulator with power output from said fuel cell; and
   changeover means for switching said DC/DC converter into said start up mode during starting of said fuel cell, and for switching said DC/DC converter into said charging mode during rated operation of said fuel cell.

8. An electrical power supply system according to claim 7, wherein said changeover means includes means for comparing voltage outputs from said fuel cell and said DC/DC converter, and for switching an operating mode of said DC/DC converter in response thereto.

9. A circuit arrangement for supplying electrical energy to a power supply which has a fuel cell, including power consuming auxiliary components for operating said fuel cell, and an electric energy accumulator, comprising:
   a DC/DC converter for connection between said accumulator and said fuel cell, including said auxiliary components, said DC/DC converter being operable in a start up mode for supplying power from said accumulator to said auxiliary components, and in a charging mode for charging said accumulator with power output from said fuel cell; and
   changeover means for switching said DC/DC converter into said start up mode during starting of said fuel cell, and for switching said DC/DC converter into said charging mode during rated operation of said fuel cell.

10. The circuit arrangement according to claim 9, wherein said changeover means includes means for comparing voltage outputs from said fuel cell and said DC/DC converter, and for switching an operating mode of said DC/DC converter in response thereto.

* * * * *